United States Patent [19]

Kretschmer, Jr. et al.

[11] Patent Number: 5,351,058
[45] Date of Patent: Sep. 27, 1994

[54] GENERAL PURPOSE SIDELOBE CANCELLER SYSTEM

[75] Inventors: Frank F. Kretschmer, Jr., Laurel; Bernard L. Lewis, Oxon Hill, both of Md.

[73] Assignee: The United States of America as represented by the Secretary of the Navy, Washington, D.C.

[21] Appl. No.: 25,952

[22] Filed: Feb. 26, 1979

[51] Int. Cl.$^5$ ............................ G01S 3/16; G01S 3/28
[52] U.S. Cl. ..................................... 342/384; 342/381
[58] Field of Search ................... 343/100 LE, 100 CL; 325/371; 342/381, 384

[56] References Cited

U.S. PATENT DOCUMENTS 3,938,153 2/1976 Lewis et al. ................... 343/100 LE
4,005,426 1/1977 White ........................... 343/100 LE Primary Examiner—Theodore Blum
Attorney, Agent, or Firm—Thomas E. McDonnell

[57] ABSTRACT

A digital, open-loop, sidelobe canceller system includes an arrangement of auxiliary-channel preprocessing cancellers and a series of main-channel cancellers in which specific cancellers average a different number of samples for cancelling both barrage (continuous) jamming and false-target-repeater jamming, which enter the sidelobes of a radar antenna. The preprocessing cancellers and each of the main-channel cancellers, except the last succeeding main-channel canceller, use long-time averaging (averaging over a large number, n, of samples of the main and auxiliary signals, where n>>2) for removing barrage jamming from the main signal. The last succeeding main-channel canceller uses short-time averaging (averaging over approximately 2–4 samples) for removing false-target-repeater jamming from the main signal.

3 Claims, 2 Drawing Sheets

GENERAL PURPOSE SIDELOBE CANCELLER SYSTEM

BACKGROUND OF THE INVENTION

This invention relates generally to a sidelobe canceller system for cancelling interference (i.e., jamming) signals from signals received by a main radar antenna. More specifically, the invention relates to a sidelobe canceller system for cancelling both barrage jamming and false-target-repeater jamming from a radar receiver by averaging a large number of samples of signals for preprocessing the interference and cancelling barrage jamming, and then averaging a small number of samples for removing false-target jamming.

Barrage jammers transmit continuous interference over a frequency band which is broad enough to include the frequency band of a radar. Such interference may appear over substantially all of the radar display.

False-target-repeater jammers receive signals from the sidelobes of a radar antenna, delay and amplify the signals, and return the signals with enough gain to be received through the sidelobes so that false or apparent targets appear on the radar display.

The response time of conventional analog cancellers is too slow, that is, the operational bandwidth of such cancellers is too low, for cancelling false targets. Therefore, the most typical method for cancelling both forms of jamming includes an analog canceller system for cancelling barrage jamming and a sidelobe blanker system for removing false targets. The disadvantage of this method is that a sidelobe blanker responds to barrage jamming as well as to false targets. Therefore, if the radar is being jammed by barrage and false target interference, the sidelobe blanker will blank not only the false targets but also the barrage jamming, thereby possibly continuously blanking the entire radar display. Thus, in the presence of barrage interference the sidelobe blanker must be turned off and false targets are not blanked. Some sidelobe blanker systems are designed to shut off so as not to continuously blank the display, but such systems do not blank false targets while in a shut-off position.

Existing digital canceller systems cancel barrage jamming. Such systems require a number of cancellers in a main signal channel and in each of M auxiliary signal channels for cancelling interference from M barrage jammers. Each main-channel canceller must average a large number n (n>>2) of samples of main and auxiliary signals, that is, long-time averaging, in order to minimize any cancellation of the desirable component of the main signal at the main-channel canceller. For example, if a main-channel canceller averages over only 2 or 3 samples, that canceller will cancel ½ or ⅓, respectively, of the desirable signal which is fed to the canceller. However, cancellation of false targets requires a fast response time, or short-time averaging, that is, averaging over a small number (approximately, 2–4) of samples. If each main-channel canceller of an existing digital canceller system performs short-time averaging, both barrage jamming and false targets may be cancelled but, as previously indicated, a significant amount of the desirable signal will also be cancelled. This results in an unsatisfactory output of the desirable signal.

SUMMARY OF THE INVENTION

The general purpose and object of the present invention is to cancel both barrage and false-target jamming from a main radar signal without significantly cancelling the desirable component of the main radar signal. This and other objects of the present invention are accomplished by a digital, open-loop, sidelobe canceller system in which the last succeeding canceller in a series of main-channel cancellers samples main and auxiliary signals by short-time averaging while the other cancellers use long-time averaging.

The system includes cancellers in a main channel and in M auxiliary channels for cancelling interference from M-1 barrage jammers and from one or more false-target jammers.

The cancellers which use long-time averaging remove the barrage jamming and provide auxiliary-channel residue outputs of false-target interference correlated with false-target signals in the main radar signal. The canceller which performs short-time averaging removes the false targets. If no false targets are present the short-time-averaging canceller may cancel interference from an additional source of barrage jamming. Therefore, any significant loss of the desirable component of the main radar signal occurs at only the last succeeding canceller.

An advantage of the present invention is that it cancels false-target interference in the presence of barrage jammers.

Another advantage is that the invention is a sidelobe cancellation system for cancelling both barrage and false-target interference, and does not require a separate blanking system.

Still another advantage is that the canceller system cancels a minimum amount of the desirable component of the main radar signal.

A further advantage is that the canceller system having M auxiliary channels cancels either M-1 barrage jammers and one or more false target jammers, or M barrage jammers.

Other objects and advantages of the invention will become apparent from the following detailed description of the invention when considered in conjunction with the accompanying drawing wherein:

DETAILED DESCRIPTION OF THE INVENTION

Figure 1:
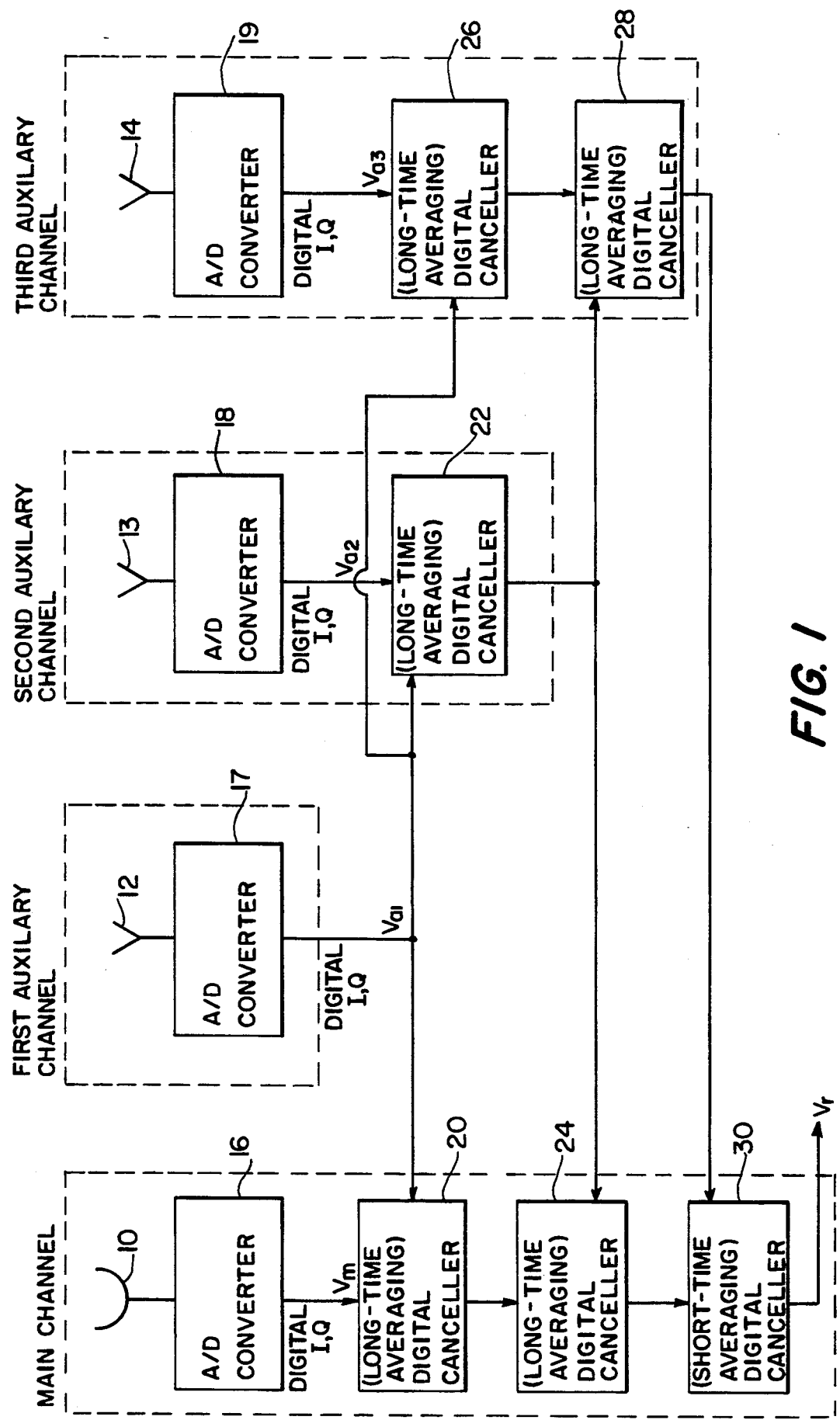
FIG. 1 is a block diagram of a general purpose sidelobe canceller system.

A sidelobe-canceller system for cancelling both barrage (continuous) and false-target interference signals from a main radar antenna signal is shown in FIG. 1. A main-channel includes a directional main radar antenna 10 having a main lobe which has a high gain and sidelobes having low gain. The main lobe is normally oriented toward a target and receives target reflections primarily, while the sidelobes primarily receive interference (e.g., jamming) coming in from other directions. First, second and third auxiliary channels include omnidirectional auxiliary antennas 12, 13 and 14, which have a gain greater than the gain of the sidelobes of main radar antenna 10 and receive interference signals primarily. The outputs of main radar antenna 10 and auxiliary antennas 12, 13 and 14 are fed to conventional receivers (not shown) and are then converted in identical A/D converters 16, 17, 18 and 19. The output of A/D converter 16 is the main radar input and the outputs of A/D converters 17, 18, 19 are auxiliary inputs. Only three auxiliary inputs have been shown, but at least M auxiliary inputs are needed for cancellation of signals from M-1 barrage jamming sources and one or more false-target jamming sources.

Figure 2:
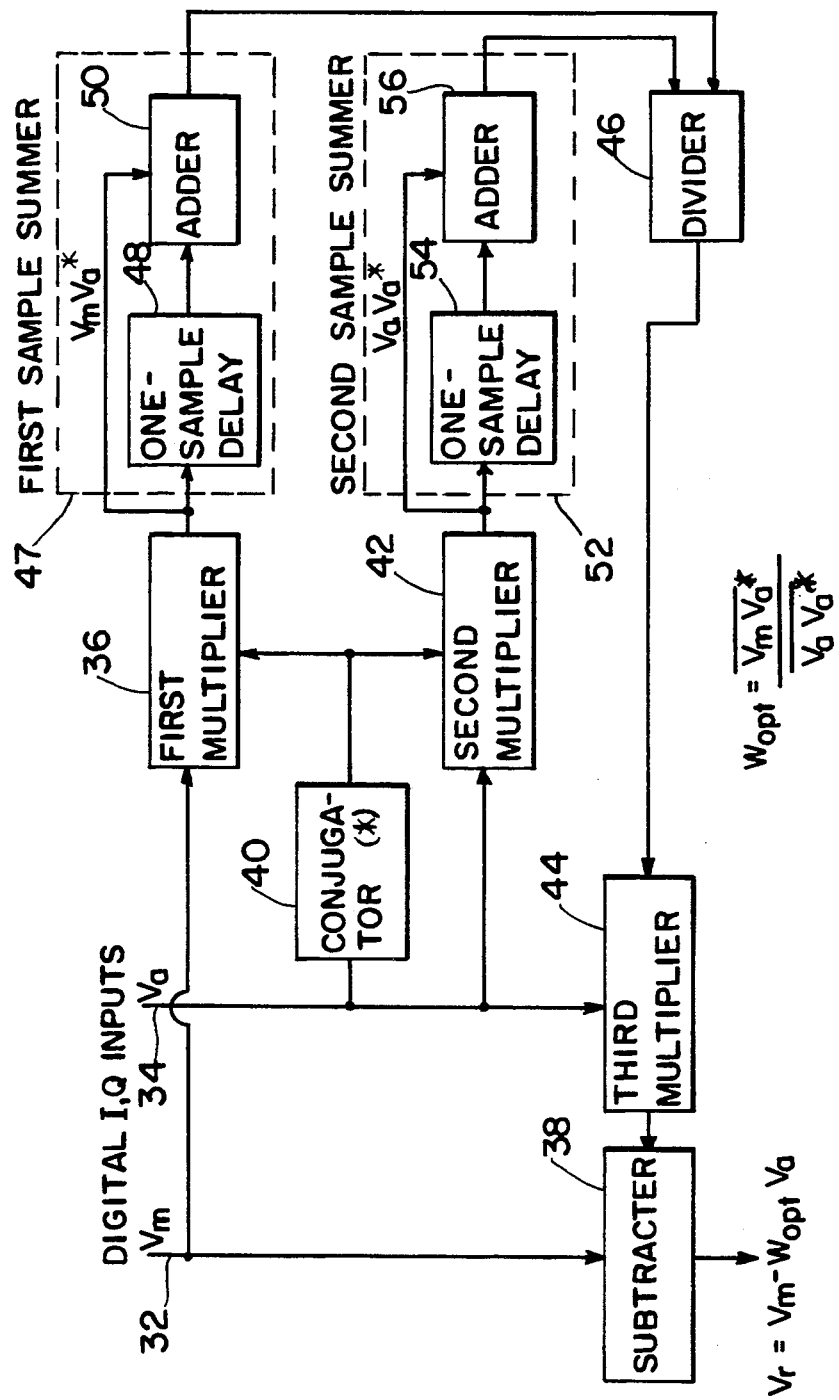
FIG. 2 is a block diagram of a digital sidelobe canceller for use in the system of FIG. 1.

The output of A/D converter 16 is connected to the main terminal of digital open-loop canceller 20 which is shown in FIG. 2 and is described in U.S. Pat. No. 4,086,592, hereby incorporated by reference. The output terminal of digital canceller 20 is connected to the main terminal of digital canceller 24, which is similarly connected to digital canceller 30.

The outputs of A/D converters 17, 18 and 19 are connected to a preprocessing configuration of digital cancellers. In the preprocessing configuration, A/D converter 17 of the first auxiliary channel is connected to the auxiliary terminal of main-channel digital canceller 20. In addition, the output of A/D converter 17 is connected to the auxiliary terminals of second and third auxiliary-channel digital cancellers 22, 26. Digital cancellers 22, 26 have their main terminals connected to A/D converters 18, 19 respectively. The output of digital canceller 22 is connected to the auxiliary terminal of main-channel digital canceller 24 and to the auxiliary terminal of digital canceller 28 of the third auxiliary channel. The output of digital canceller 26 is connected to the main terminal of digital canceller 28. The output of digital canceller 28 is connected to the auxiliary terminal of main-channel digital canceller 30. If the sidelobe canceller system is expanded to four auxiliary antennas(or more) the preprocessing configuration is easily expanded. The fourth auxiliary channel would include three, series-connected, digital cancellers which would each receive at its auxiliary terminal the output of one of the previous three auxiliary channels. This could be extended to any number of auxiliary channels.

FIG. 2 shows the digital open-loop canceller used in FIG. 1. A main terminal 32 receives a signal $V_m$, for example, a radar return received by the main antenna of a radar or, as shown in the preprocessing configuration in FIG. 1 and denoted $V_{a2}$ and $V_{a3}$ therein, an auxiliary input signal. If $V_m$ is from the main antenna 10, it is a complex signal which contains vector components of desired target returns and undesired barrage and false-target interference signals. If $V_m$ is from one of the auxiliary antennas, it is a complex signal having vector components of barrage and false-target interference signals both correlated and uncorrelated with interference signals from the other auxiliary antennas and does not contain desired target returns of significant magnitude. Since $V_m$ is a complex signal, in digital form it must be separated into its real (I) and imaginary (Q) components. The Q, or quadrature component, is 90° out-of-phase with the I component.

The canceller also has an auxiliary terminal 34 which receives an auxiliary input $V_a$ from an omnidirectional auxiliary antenna, such as auxiliary antennas 12, 13, 14 or from another canceller as in the preprocessing configuration. $V_a$ may have a component which is correlated to an undesirable component of $V_m$ and will be used in cancelling this undesirable component. For example, if $V_m$ is from the main antenna and has target-return components and interference components and $V_a$ has interference components which are correlated with the interference components of $V_m$, then the correlated interference components will be cancelled from $V_m$. Similarly, in the preprocessing configuration if $V_m$ and $V_a$ have correlated interference components, they will be cancelled from $V_m$. Specifically, cancellers 20, 22, 24, 26, 28 cancel barrage jamming, and canceller 30 eliminates false targets. This is the invention and the significance of this will be explained subsequently.

Before describing the apparatus of FIG. 2, the theory of operation will be examined. The digital open-loop canceller departs from prior-art adaptive closed-loop cancellers by deriving the weight, W, to be applied to the auxiliary signal in a different way such that it is not dependent on loop gain or auxiliary-signal power level. In the digital open-loop canceller, the basic equation $$V_r = V_m - WV_a \tag{1}$$

is multiplied by $V_a^*$ and averaged to obtain the following relation $$\overline{V_r V_a^*} = \overline{V_m V_a^*} - W \overline{V_a V_a^*} \tag{2}$$

The objective of the canceller is to establish a weight W which causes a zero correlation to occur between the residual output signal $V_r$ and the auxiliary signal $V_a$. The unnormalized correlation between $V_r$ and $V_a$ is by definition $\overline{V_r V_a^*}$. A zero correlation indicates that the correlated components of $V_m$ and $V_a$ have been cancelled leaving only the desired uncorrelated components as the residual signal $V_r$. If the correlation is set equal to the desired value of zero in eq (2), the equation can be solved for the optimum steady-state value of W as follows:

$$0 = \overline{V_r V_a^*} = \overline{V_m V_a^*} - W_{opt} \overline{V_a V_a^*} \tag{3}$$

$$W_{opt} = \frac{\overline{V_m V_a^*}}{\overline{V_a V_a^*}} \tag{4}$$

The weight $W_{opt}$ is substituted into the general equation (1) for canceller loops as follows:

$$V_r = V_m - \frac{\overline{V_m V_a^*}}{\overline{V_a V_a^*}} V_a \tag{5}$$

This is the equation which defines the digital open-loop canceller. Note that it is not dependent on a loop gain but is solely dependent on the values of the inputs, $V_a$ and $V_m$, to the canceller. Since the canceller is not a closed loop and is not dependent on gain or power level, it does not have the problems, such as a slow response time or conditional stability, of the adaptive closed loops.

Returning to FIG. 2, the digital I and Q components of $V_m$ are fed to a first multiplier 36 and to a subtractor 38. The digital I and Q components of $V_a$ are fed to a conjugator (*) 40, a second multiplier 42 and to a third multiplier 44. The conjugator receives the I and Q components of $V_a$ and multiplies the imaginary part Q by $-1$ to obtain $V_a^*$. The output of conjugator 40 is fed to first multiplier 36 for multiplication with $V_m$ to obtain the product $V_m V_a^*$. The product is applied to first sample summer 47 which will sum n samples from n range cells. An example of a two-sample summer is shown as comprising a one-sample delay 48 and adder 50. The first signal is delayed one sampling period in one sample delay means 48 and then added to a second sample in adder 50. The output of conjugator 40 is also fed to second multiplier 42 for multiplication with $V_a$ to obtain the product $V_a V_a^*$. The product is applied to second sample summer 52 which sums n samples from n range cells. Sample summer 52 may contain for example one-sample delay 54 and adder 56 and is the same as sample summer 47.

The output sums from sample summers 47, 52 are used as part of an averaging process. Normally, to average, the output sums of sample summers 47 and 52 would be divided by the number of the samples summed. However, since the outputs are fed to a divider 46 the sample number which is the same for each sample summer cancels itself out in the division. The output of divider 46 produces the following relation, $$\frac{\overline{V_m V_a^*}}{\overline{V_a V_a^*}}.$$

This quantity is the desired value for the weight W.

The output of divider 46 having weight $W_{opt}$ is fed to third multiplier 44, which also receives $V_a$, to obtain the following relation:

$$\frac{\overline{V_m V_a^*}}{\overline{V_a V_a^*}} V_a.$$

The output of multiplier 44 is fed to subtractor 38, which also receives $V_m$, to obtain the following relation which is the desired canceller equation:

$$V_r = V_m - \frac{\overline{V_m V_a^*}}{\overline{V_a V_a^*}} V_a.$$

This equation is applied separately to each sample to cancel interference.

It can be shown that the quantities of $V_m V_a^*$ and $V_a V_a^*$ must be averaged (i.e., $\overline{V_m V_a^*}$ and $\overline{V_a V_a^*}$) or all signals out of the canceller are cancelled including the desired components of $V_m$. For example if only one sample of $V_m$ and $V_a$ is used, eq. (4) is as follows:

$$W = \frac{V_m V_a^*}{V_a V_a^*} = \frac{V_m}{V_a}.$$

Substituting this value of W in eq. (1) yields:

$$V_r = V_m - \frac{V_m}{V_a} V_a = V_m - V_m = 0.$$

It is further shown by simulation that optimum cancellation occurs when two samples are averaged with the results being slightly different as the number of averaged samples increases. As more pulses are averaged, less of the uncorrelated components (both thermal noise and desired targets) are cancelled. The amount of cancellation of the desired signals will decrease by the same amount as noise cancellation thus leaving the signal-to-noise ratio unchanged. Additionally, as more pulses are averaged, the period of time over which the target signals affect the canceller weight is increased while the effect on the amplitude of the weight is decreased. Therefore, short-time averaging, that is, averaging over approximately 2-4 samples, provides optimum cancellation of interference (both barrage and false target) but also cancels a significant amount of the desired signals. Although long-time averaging, that is, averaging over a large number n of samples, where n>>2, cancels substantially less of the desired signal, it causes the weight W to become a small value when $V_m$ and $V_a$ are uncorrelated as is the case when jamming is infrequent, such as with false target interference. This occurs because the denominator terms of W are additive nonnegative values whereas the numerator terms are positive and negative and average to zero. However, in the presence of barrage jamming, which is continuous, where components of $V_m$ and $V_a$ are correlated, long-time averaging provides a weight which cancels the barrage jamming. Thus, in FIG. 1 cancellers 20, 22, 24, 26 and 28 must perform long-time averaging and canceller 30 must use short-time averaging, because this configuration cancels barrage jamming yet preserves most of the desired signal until the last cancellation operation where false-target interference is eliminated.

The cancellers 20, 22, 24, 26, 28 and 30 of FIG. 1 are as shown in FIG. 2 except that each of the sample summers 47, 52 includes n−1 one-sample delays 48, 54, respectively, where n in the number of samples over which a canceller averages.

In operation, the configuration shown in FIG. 1 may cancel barrage jamming from two sources of interference and false targets from one or more sources. The radar signal from antenna 10 and auxiliary signals from antennas 12, 13, 14 are converted to digital I and Q components. The main channel signal, which includes barrage and false-target jamming, from A/D converter 16 is fed to the main terminal of main-channel canceller 20. The output of the first auxiliary channel from A/D converter 17 is fed to the auxiliary terminal of canceller 20. As described with respect to FIG. 2, canceller 20 performs long-time averaging and cancels all correlated components of barrage jamming between the main-channel signal and the first auxiliary-channel signal. The output of canceller 20 is a residual signal having components of barrage jamming and false-target jamming which are uncorrelated with the first auxiliary-channel signal.

The same vector components of the first auxiliary-channel signal which are correlated with the main-channel signal may also exist in the second and third auxiliary channels. It is therefore necessary to use the first auxiliary signal to remove these same correlated components from the second and third auxiliary channels so they are not reintroduced into the main channel during later processing in digital cancellers 24, 30.

To accomplish this, the first auxiliary-channel output from A/D converter 17 is also fed to the auxiliary terminals of digital cancellers 22, 26 for the second and third auxiliary channels. The latter cancellers receive the second and third channel auxiliary signals at their main terminals from A/D converters 18, 19, respectively, and use long-time averaging so that all correlated components between the first auxiliary channel and the second and third auxiliary channels are cancelled. This prevents the correlated components from being reintroduced into the main channel again.

After removal of correlated components from the main channel by the first auxiliary channel, the second auxiliary-channel signal from digital canceller 22 is fed to main-channel digital canceller 24 where correlated components of barrage jamming between the main channel and second auxiliary-channel signal are cancelled by using long-time averaging. This leaves a main-channel residue signal having components of false-target jamming which are uncorrelated with the first and second auxiliary-channel signals.

Just as the correlated components between the first auxiliary and main channels were cancelled from the second and third auxiliary-channel signals, the correlated components between the second auxiliary and main channel must be cancelled from the third auxiliary channel. This is done by using the second auxiliary-channel-signal out of digital canceller 22 as the input to the auxiliary terminal of digital canceller 28 which receives the third auxiliary-channel signal at its main terminal. The correlated components are cancelled and the output is fed to main-channel digital canceller 30 which performs short-time averaging for cancelling the correlated components of the false-target jamming between the third auxiliary channel and the main channel. The residual output is the main-channel signal with all correlated components of barrage and false-target interference from the first, second, and third auxiliary channels removed. This means that all interference from two barrage jammers and one or more false-target jammers has been removed from each sample. If no false-target interference exists, the system shown in FIG. 1 may cancel interference from three barrage jammers because canceller 30, using short-time averaging, may cancel barrage jamming as well as false targets.

The described sidelobe canceller system includes the use of long-time and short-time averaging to solve the stated problems of the prior art. The system eliminates barrage jamming with no tendency for loop-to-loop instability and with much faster response time than is available in conventional configurations such as analog, parallel-loop arrangements. The system also removes false targets without blanking the entire radar display in the presence of barrage jamming. Both types of interference are cancelled by the digital canceller system yet a substantial amount of the desired component of the radar signal is preserved.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A system for cancelling barrage interference and false-target interference from M-1 barrage interference sources and one or more false-target interference sources, comprising:

a main channel having a main radar antenna and an analog-to-digital (A/D) converter for producing a digital, complex, main input signal, a number, M, of serially connected digital open-loop canceller means each having a main terminal, an auxiliary terminal and an output terminal, the first of said serially connected canceller means receiving the output of said A/D converter at its main terminal and the remainder of said canceller means each receiving the output from the output terminal of the preceeding canceller at its main terminal; and a series of M auxiliary channels each having an auxiliary antenna and an A/D converter for producing a digital, complex, auxiliary input signal which auxiliary input signal and said main input signal may have correlated interference signal components, the first auxiliary channel providing a first auxiliary-channel signal to one of said digital open-loop cancellers of said main channel, the remaining auxiliary channels each having, respectively, a number of serially connected digital open-loop canceller means in an amount equal to one less than its number in the series, each said canceller means having a main terminal, an auxiliary terminal and an output terminal, the first serially connected canceller means of each auxiliary channel receiving the output of the A/D converter for the respective channel and the remainder of the serially connected canceller means each receiving the output from the output terminal of the preceeding canceller means at its main terminal, the last serial, open-loop canceller means for each auxiliary channel providing the auxiliary channel output, each canceller means of an auxiliary channel receiving at its auxiliary terminal the auxiliary channel output from a different one of the preceeding auxiliary channels, the auxiliary channel outputs also each being provided to the auxiliary terminal of a different one of the main-channel canceller means, each said digital open-loop canceller means acting to sample the signal at its main terminal and the signal at its auxiliary terminal and to decorrelate the signal at the main terminal from the signal at the auxiliary terminal, each said serially connected canceller means of said main channel, except the last, and the serially connected canceller means of said auxiliary channels acting to cancel said barrage interference correlated between said main input signal and said auxiliary input signals and to provide a residue main signal output and an auxiliary signal output, said last succeeding canceller means of said main channel acting to cancel said false-target interference correlated between said main input signal and said auxiliary input signals.

2. The system of claim 1 wherein said serially connected canceller means of said main channel, except the last succeeding canceller means of the main channel, and said serially connected canceller means of said auxiliary channels are long-time averaging digital cancellers, and said last succeeding canceller means of said main channel is a short-time averaging digital canceller.

3. The system of claim 2 wherein said long-time averaging cancellers average a number, n, of samples, where n is much greater than 2, and said short-time averaging canceller averages approximately 2-4 samples.

* * * * *